United States Patent
Goldman

(10) Patent No.: US 11,045,730 B1
(45) Date of Patent: Jun. 29, 2021

(54) SYSTEMS AND METHODS FOR IOT ENABLED ARCADE GAMES

(71) Applicant: Wayne Goldman, Newport Beach, CA (US)

(72) Inventor: Wayne Goldman, Newport Beach, CA (US)

(*) Notice: Subject to any disclaimer, the term of this patent is extended or adjusted under 35 U.S.C. 154(b) by 0 days.

(21) Appl. No.: 16/192,776

(22) Filed: Nov. 15, 2018

Related U.S. Application Data

(63) Continuation-in-part of application No. 14/857,160, filed on Sep. 17, 2015.

(60) Provisional application No. 62/051,565, filed on Sep. 17, 2014.

(51) Int. Cl.
| | |
|---|---|
| *A63F 13/23* | (2014.01) |
| *A63F 13/355* | (2014.01) |
| *G07F 17/32* | (2006.01) |
| *G07F 17/34* | (2006.01) |
| *A63F 13/213* | (2014.01) |

(52) U.S. Cl.
CPC .......... *A63F 13/355* (2014.09); *A63F 13/213* (2014.09); *G07F 17/3223* (2013.01); *G07F 17/34* (2013.01)

(58) Field of Classification Search
CPC ........ A63F 13/12; A63F 13/23; A63F 13/235; A63F 13/30; A63F 13/32; A63F 13/323; A63F 13/327; A63F 13/33; A63F 13/335; A63F 13/352; A63F 13/358; A63F 2300/40; G07F 17/32
See application file for complete search history.

(56) References Cited

U.S. PATENT DOCUMENTS

| | | | | |
|---|---|---|---|---|
| 2001/0003099 A1* | 6/2001 | Von Kohorn | ........ | H04N 7/0884 463/40 |
| 2002/0193159 A1* | 12/2002 | Maejima | ................. | G07F 17/32 463/20 |
| 2007/0114725 A1* | 5/2007 | Peck | ........................ | A63F 9/30 273/447 |
| 2008/0108434 A1* | 5/2008 | Mann | ...................... | G07F 17/32 463/42 |
| 2008/0305864 A1* | 12/2008 | Kelly | .................. | G07F 17/3232 463/27 |
| 2009/0191931 A1* | 7/2009 | Peck | ........................ | G07F 17/32 463/7 |
| 2009/0253507 A1* | 10/2009 | Ishii | ...................... | A63F 13/355 463/32 |
| 2011/0078030 A1* | 3/2011 | Borst | ..................... | G06Q 30/02 705/14.73 |
| 2011/0166941 A1* | 7/2011 | Sutton-Shearer | ...... | G06Q 10/10 705/14.69 |
| 2014/0179421 A1* | 6/2014 | Quinn | .................. | A63F 13/355 463/31 |
| 2016/0078716 A1 | 3/2016 | Goldman | | |

\* cited by examiner

*Primary Examiner* — Omkar A Deodhar
(74) *Attorney, Agent, or Firm* — J. Curtis Edmondson; Law Offices of J. Curtis Edmondson

(57) ABSTRACT

A system for remotely playing an arcade game, such as a "claw game", in an "Internet of Things" (IOT) enabled arcade gaming system. One or more players interacts with the system using web enabled smart electronic devices. The system also manages one or more remote players as they interact remotely with a single physical arcade game.

1 Claim, 14 Drawing Sheets

SYSTEMS AND METHODS FOR IOT ENABLED ARCADE GAMES

CROSS REFERENCE TO RELATED APPLICATIONS

The present application is a CIP of U.S. Utility application Ser. No. 14/857,160 filed on Sep. 17, 2015, which claims the benefit of U.S. Provisional Patent Application No. 62/051,565, filed on Sep. 17, 2014 which is herein incorporated by reference in its entirety.

FIELD

The present inventive subject matter relates to arcade games in general and to systems and methods for IoT enabled arcade games in particular.

BACKGROUND

Arcade Games have been around for over 80 years, beginning with the pin ball machine in the 1930s to the sophisticated computer animation infused gaming we experience at the arcades today. Overtime, arcade games have fallen in popularity as game players have moved onto forms of gaming namely computer games on consoles made by Sony, Nintendo, Microsoft and others. Further evolution led to the migration of many to mobile gaming replacing the gaming consoles with mobile phones. Despite the competition by these alternate games, arcade games are still popular. Arcade games include claw game, pinball machine, pachinko, computerized simulations of war games or sports events.

For example, a claw game uses a joystick to control lateral movement of a claw in which the player attempts to position, drop the claw to grab stuffed animals and other prizes in a transparent box. Usually one play per credit, the player moves the joystick within a time limit and presses a button to drop the claw-like attachment into the bin. The machine is programmed to open the claw, grab a prize (if positioned properly) from the bin and close its claw, raise upwards, move back to a stationary position over a chute and drop any grabbed prize in a chute.

The Internet of Things (IOT) provides a platform to manipulate physical things via internet. Thus, a need exists for an IOT enabled arcade gaming systems, which can provide remote arcade play using web enabled smart electronic devices with embedded processors, sensors and communication hardware to collect, send and act on data they acquire from their remote environments using cloud computing technology through the internet. The system would allow one or more players to enjoy a manipulation of arcade games from the comfort of their homes.

SUMMARY

An embodiment for a system for remotely playing an arcade game includes, a user electronic device, the user electronic device controlled by an user and connected to a cloud server with cloud computing capability, an arcade game center with one or more arcade game machines, the arcade game center located at a first remote site and connected to the cloud server; and an arcade center administrator, the arcade center administrator located at a second remote site and managing the one or more arcade game machines at the arcade game center and connected to the cloud server via an Internet of Things (IOT) platform.

Another embodiment for a system for remotely managing an arcade game play includes, a game service module, game service module synchronously communicating with a user, an user management service, game status service, game sessions service and a user queue service.

An yet another embodiment for an arcade game nodes system, includes a master node or super node, an administrator node, a player node and a watcher node. The master node or super node which being capable of controlling all transactions between the different arcade game nodes and responsible for user sign-ups, redemptions of virtual currency for rewards, awarding score points and credits, queuing up players and more. Each of the arcade game nodes being associated with an node account that stores units of a virtual currency as an account balance and may also be configured to exchange or redeem units of the virtual currency for units of a real world or fiat currency or physical objects, including but not limited to toys, rewards and gifts.

The foregoing is not intended to be an exhaustive list of embodiments and features of the present inventive subject matter. Persons skilled in the art are capable of appreciating other embodiments and features from the following detailed description in conjunction with the drawings.

BRIEF DESCRIPTION OF THE DRAWINGS

These and other features and advantages of the present description will be better understood by reference to the following drawings wherein.

DETAILED DESCRIPTION

Figure 1:
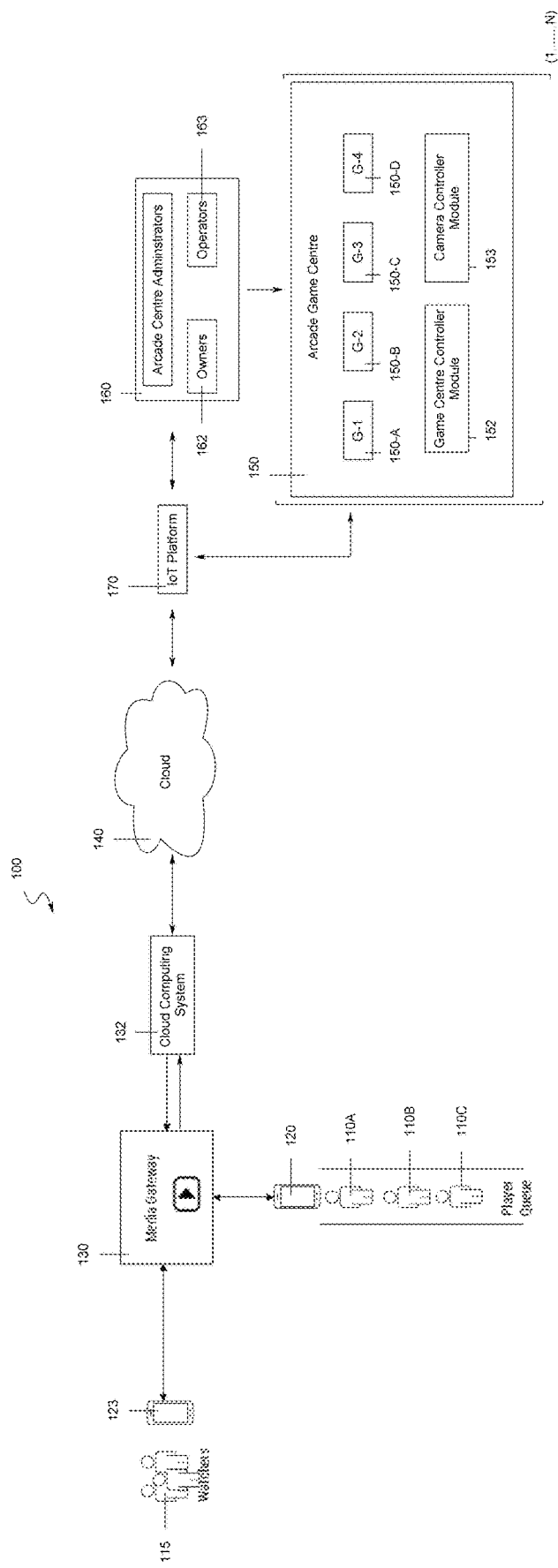
FIG. 1 illustrates a system architecture for a remote arcade play system.

Representative embodiments according to the inventive subject matter are shown in FIG. 1-5, wherein similar features share common reference numerals.

"Player" shall typically mean one or more individually playing players interacting with an arcade game, but does not have to be so limited, such that teams of individuals may be a "Player" interacting with the program.

"Watcher" shall typically mean one or more individuals viewing an arcade game that is played by one or more players, but does not have to be so limited, such that teams of viewers may be "Watchers".

"Owners" and "Operators" mean one or more owners and operators owning and managing arcade game centers, but does not have to be so limited, such that teams of individuals having financial and ownership interests in the arcade game center may be "Owners" and "Operators".

"Arcade Game" shall mean any physical game as described in this application unless noted otherwise. A "game machine" is an "arcade game machine" as defined below. On an exemplary note the arcade game could be a claw game, a skee ball game, a bowling game, a casino game, a carnival game, a slot machine game, a horse derby game, a clown balloon water gun game, any real physical game or any arcade game.

Persons skilled in the art will recognize that many modifications and variations are possible in the details, materials, and arrangements of the parts and actions which have been described and illustrated in order to explain the nature of this concept and that such modifications and variations do not depart from the spirit and scope of the teachings and claims contained therein. The invention here is described in general to any arcade game and for exemplary purpose the description given below is related to a arcade game played on a smart phone but the same can be played with a tablet computer or personal/portable computer.

A non-limiting embodiment of a network architecture for an IOT enabled arcade gaming system 100 is as illustrated in FIG. 1. One or more player 110A-C are connected to the internet with cloud capability 140 through their personal electronic smart device 120 and a media gateway 130. The smart devices can be operated based on various mobile operating software like Android, iOS, Windows or Blackberry. The smart devices 120 have embedded sensors in them which serve as the input points from where the player 110 communicates the player-initiated instructions for remotely playing the arcade games at an arcade game center 150.

One or more watchers 115 are connected to the internet with cloud capability 140 through a personal electronic smart device 123 and a media gateway 130. The smart devices can be operated based on different mobile operating software like Android, iOS, Windows or Blackberry. The media gateway 130 connects the watchers to the game center 150 via the Cloud 140. The cloud 140 can be an internet.

The media gateway 130 connects the player to the game center 150 via the cloud 140. A cloud computing system 132 connects the media gateway 130 and the cloud 140. The game center 150 includes one or more games/game machines G-1 150A, G-2 150B, G-3 150C and G-4 150D operably controlled by a game center controller module 152. Each of the game center games 150A-D includes one or more cameras (not shown) controlled by a camera controller module 153. The one or more cameras (C1, C2, . . . Cn) connected to the game center can be controlled by the camera control module 153. For example, a front camera may be connected at front side, a side camera may be connected at a left/right side and a top camera may be connected at a top side of the arcade game machine 150.

The arcade game center 150 is administered by arcade center administrators 160. For example, owners 162 owning the arcade game center may be administrators 160. Alternatively, operators 163 of arcade game center also can be administrators 160. A single owner can own one or more arcade game center 150 with one or more arcade games 150 A-C or multiple owners can own one or more arcade game center 150 with one or more arcade games 150 A-C. In other examples, a single operator or multiple operators can operate one or more arcade game center 150 with one or more arcade games 150 A-C.

Together, the players 110, the watchers 115, the owners 162, the operators 163 are referred to as users. Each user may be associated with a unique User ID that is a unique ID that represents the user.

An IOT platform 170 connected to the cloud 140 may be a physical device or a software program that serves as the master control and connection point between the cloud 140, cloud computing system 132, game center controller module 152, camera controller module 153, embedded sensors at the arcade game center 150 and smart electronic devices 120/123 operated by players 110 and watchers 115 of arcade game system 100. All data moving to the cloud 140, or vice versa, goes through the IOT platform 170, which can be either a dedicated hardware appliance or software program. The one or more players 110 and watchers 115, while playing and watching arcade games remotely with their smart electronic devices 120/123 and embedded sensors at the arcade game center 150 generate data points per second. The IOT platform 170 provides a log report of number of players and watchers using the one or more arcade games 150 A-D for the arcade game administrators 160. The IOT platform 170 preprocess all the data locally before sending it on to the cloud 140. When data is aggregated, summarized and tactically analyzed locally, it minimizes the volume of data that needs to be forwarded on to the cloud 140, which can have an impact on response times and network transmission costs. Additionally, the IOT platform 170 provides additional security for the data it transports in the arcade gaming system 100.

Arcade Game Service Management

Figure 2:
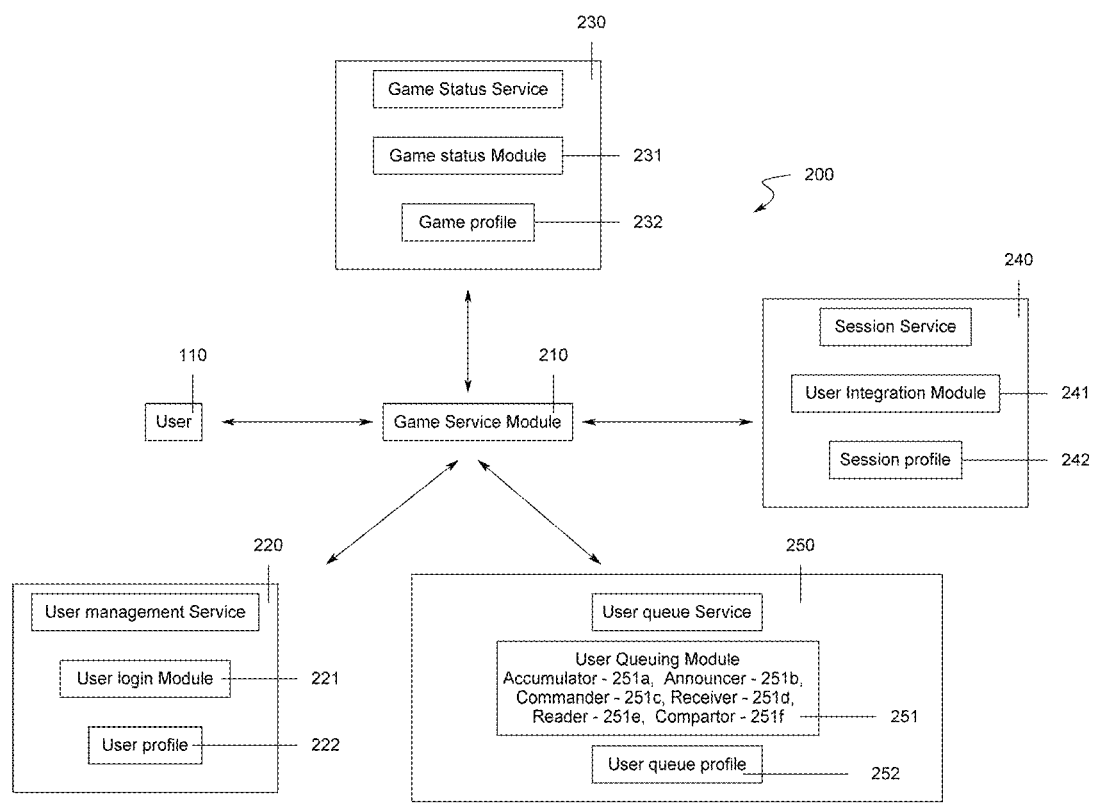
FIG. 2 illustrates a service system architecture for the system.

An arcade game service management is as described in reference to FIG. 1 and FIG. 2. Users 110 communicate with a game service module 210, as illustrated in a service diagram overview 200 of FIG. 2. Referring to FIG. 2 and FIG. 2a-2d, the game service module 210 directly communicates with a user management service 220, a game status service 230, a game session service 240 and a user queue service 250. While playing arcade games at the arcade game center 100, the game service module 210, a user management service 220, a game status service 230, a game session service 240 and a user queue service 250 are controlled by the cloud computing system 132 via the cloud 140 and the IOT platform 170.

(i) User Management

A user management service 220 enables user authentication, maintenance of user accounts and directly communicates back and forth with the game service module 210 with all queries regarding user details. The user management service 220 manages a complete listing of users with their user properties. The user properties include but not limited to user IDs, user account details, user name, contact phone number, address. User properties typically map to an information collected from the user (Ex: player 110) during user registration on a user login screen displayed on the user electronic device (Ex: player device 120) by a user login module 221. The user management service 220 can easily control issuing of user identity, add/delete required and optional data, add new properties, configure default values and data validators. Based on user inputs the user management service 220 can enable or disable users. Once a user is disabled, they will not be able to login to their application. The user management service 220 can login a new user by using registration API of user login module 221. All user properties can be automatically validated using built-in validators or custom regular expressions. Optionally, the user registration can be offered through social media login integration with all major social media networks including but not limited to, Facebook, Google, and Twitter.

The user management service 220 tracks and maintains user account details through a user profile 222. The user is allowed deposit money into the user account by to have a credit to play the arcade games or pay on the go for each game the user plays at the arcade game center 150. The user can trade and play by depositing virtual currency to the user account and yet play and win prizes. Additionally, the user profile 222 maintains a user game play history to track the number of games played by the user, number of wins and number of loses, the type of arcade game frequently played arcade games by the user, generate reports related to any of the above features. The user profile 222 also includes reports of financial health of the user account in terms of credit or deposit available for playing new games, the status of trading related to virtual currency transactions, and the like.

(ii) Game Status Service Management

A game status service 230 enables notifications regarding available games for play for users at any given time and directly communicates back and forth with the game service module 210 with all queries regarding arcade game status. A game status module 231 generates status protocols for querying status of one or more games 150A-D. In an exemplary embodiment, the game status module 231 employs Message Queuing Telemetry Transport (MQTT) protocol to communicate with arcade game center 150 via the game center controller 162 to verify the status of a game 150A-D for availability for playing by the user. A publish/subscribe protocol is employed, which is event-driven and enables messages to be pushed to the game service module 210 upon request. The central communication point is a central broker, which is in charge of dispatching all messages between the senders—game center controller 162 and the receivers—game service module 210. The arcade games 150-A-D are embedded with one or more smart sensors connected by a network 231 capable of sensing and communicating the status of the arcade game 150-A-D with the game service module 210 via the game center controller 162 and the central broker. Each arcade game 150 A-D that publishes a message to the central broker, includes a topic into the message, including but not limited to, arcade game queue, current status of the arcade game for availability (in use or not in use), estimated time of availability, number of users in the queue, and the like. The game service module 210 subscribes to a certain topic (Ex: availability of game) and the central broker delivers all messages with the matching responses to the topic. The game status service 230 tracks and maintains arcade games 150 details through a game profile 232. The game profile generates list of all arcade games 150-A-D and their respective status at any given time and constantly refreshes the list of available arcade games for play by the user. Any other communication protocol which falls in the scope of this disclosure may be employed for communicating between the game status service 330 and game service module 310.

(iii) Game Session Service Management

A game session service 240 manages one or more arcade game session played with a user and directly communicates back and forth with the game service module 210 with all details of each and every arcade game session with one more user. A user interaction application on the smart electronic device of user 110 is integrated to arcade game controller 162 via user integration module 241 of the game session service 240.

The media gateway 130, cloud computing system 132, the cloud 140 and the IOT platform 170 bridge all the data communications between the game session service 240 and the game service module 210.

The user integration module 241 communicates with the user interaction application on the user device 120 to receive one or more user generated play instructions. The user generated instructions include, key strokes, mouse click selections, touch screen enabled gestures, swipes or any other similar user play instructions. The arcade games 150-A-D are controlled by the game center controller module 152 to receive the user play instructions and implement the instructions to physical real movements at the remote arcade game center 150 without any time lag. The time lag in the transfer of player instructions to the arcade game center may depend on the connectivity network of individual users with the cloud 140. The arcade game center 150 communicates with the user interaction application on the user device 120 through the media gateway 130 to continuously supply the camera feed to the media gateway 130 which serves as the virtual view of the remote arcade game 150 for the user. The camera controller module 163 assists in implementing the user instructions for controlling the cameras at the remote arcade game center to position the cameras (C1, C2 . . . ) at the arcade game center 150 to have a desired view of the arcade game 150A-D. A different view offered include, front view, top view, bird's eye view ad any other user desired view of the arcade game. The user integration module 241 also is equipped to time each and every session and terminate the access to an arcade game upon completion of allotted time for the arcade game.

Figure 2A:
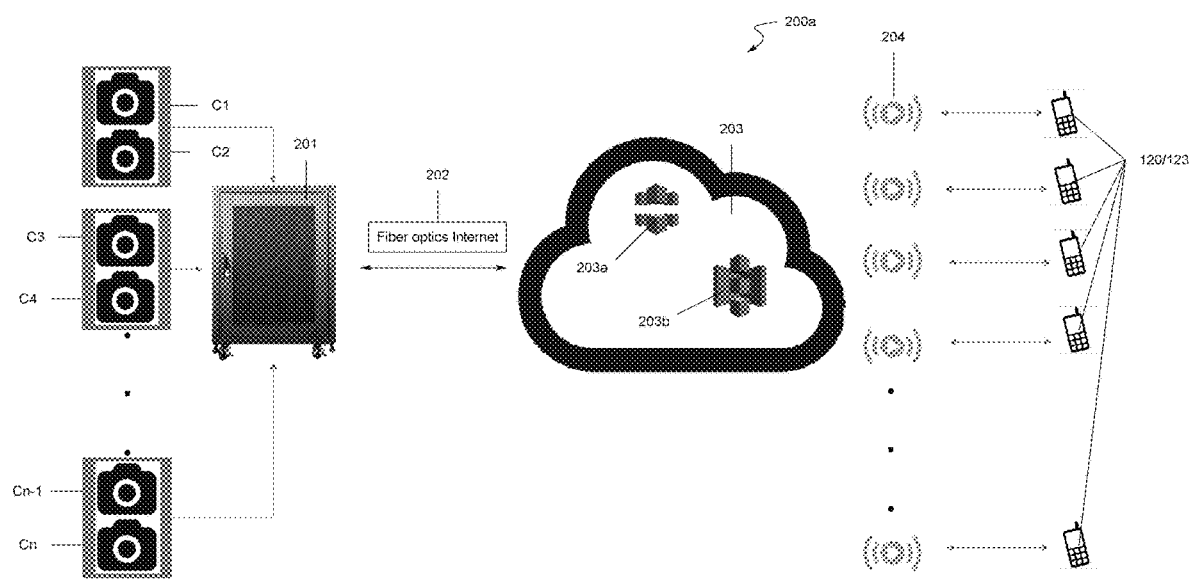
FIG. 2a-2d illustrates queueing schemes.

In an exemplary embodiment, an audio-video streaming network 200a for the arcade game system 100 is as illustrated in FIG. 2a. One or more cameras C1, C2, . . . Cn−1, Cn connected to the arcade games 150A-D at the arcade game center 150 are controlled by the camera controller module 153 to provide a continuous video stream of the arcade game 150 A-D in real time. In an example Web Real Time Communication (Web-RTC) is used for audio and video communication between the cameras C1, C2, . . . Cn−1, Cn at the arcade game center and the user electronic device 120/123. Web RTC is supported by most browsers like Microsoft edge, Google Chrome, Mozilla Firefox, Safari, Opera, Vivaldi at a desktop PC, Chrome OS, Firefox OS, Blackberry 10 and iOS at the user electronic device 120/123. In other examples the cameras C1, C2, . . . Cn−1, Cn are in synchronous communication with a heavy duty server 201 coupled to a cloud platform 203 by a fiber optic internet 202. The cloud platform 203 forms a part of the IOT platform 170 connected to the cloud computing system 132 and the cloud network 140. The incoming audio and video streams from the cameras C1, C2, . . . Cn−1, Cn are multiplexed at the cloud front 203a and stored at the cloud storage 203b. The cloud platform 203 synchronously transmits the video streams 204 to the user electronic devices 120/123. Synchronous transmission may require that the clocks in the transmitting and receiving devices are synchronized and overtime the transmitting and receiving clocks may tend to drift apart, requiring resynchronization.

The game session service 240 tracks and maintains one or more arcade games session details through a session profile 242. The session profile 242 generates list of all commands and user interactions received for a particular arcade game session and notifies the user of any wins or loses in the game session played by the user. Additionally, the session profile 242 continuously generates messages regarding the remaining time available for the game for the user to play, before the game controller module 152 terminates the access for the particular game to the user. Any other communication protocol which falls in the scope of this disclosure may be employed for communicating between the game status service 230 and game service module 210.

(iv) Managing and Queuing Traffic at the Arcade Game Centre

A traffic scenario at arcade games center 150 can be modeled and explained based on "Little's Law. According to Little's Law, the long-term average number N of users in a stationary system is equal to the long-term average effective arrival rate $\lambda$ multiplied by the average time T that a user spends in the arcade game system 100. For a given arrival rate, the time in the system is proportional to packet occupancy N=$\lambda$T, where N: average number of users in the system, $\lambda$=packet arrival rate (users per unit time), T: average delay (time in the system) per user.

A user queue service 250 manages prioritizing one or more users for playing arcade game 150A-D and directly communicates back and forth with the game service module 210 with all details of each and every user for one more arcade game 150 A-D. A user interaction application on the smart electronic device of user 110 is integrated to arcade game controller 162 via a user queueing module 251 of the user queue service 250. The user queueing module 251 receives the user login information and authenticates the user based on the user login credentials. Further the user queueing module 251 validates the user account for required amount of currency or points for game play and assigns a unique user queue ID for the user request and transfers the user game request to a queue log.

A user queue profile module 252 manages and tracks the user queue ID for availability of arcade game availability on one or more other queues. Additionally, the user queue profile module 252 continuously updates completed requests and adds new user requests to the user queue.

Figure 2B:
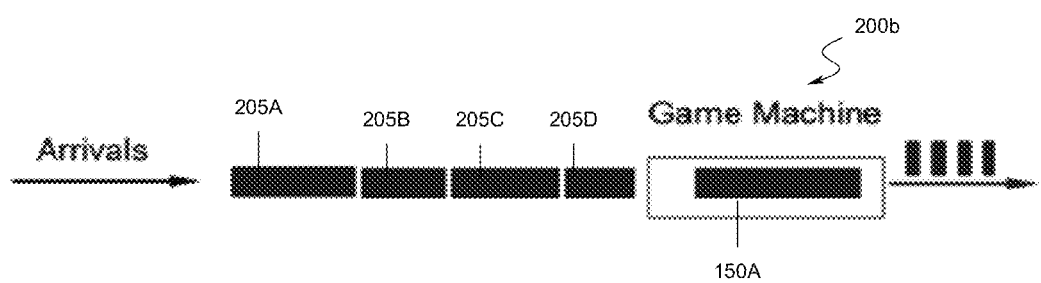
Figure 2C:
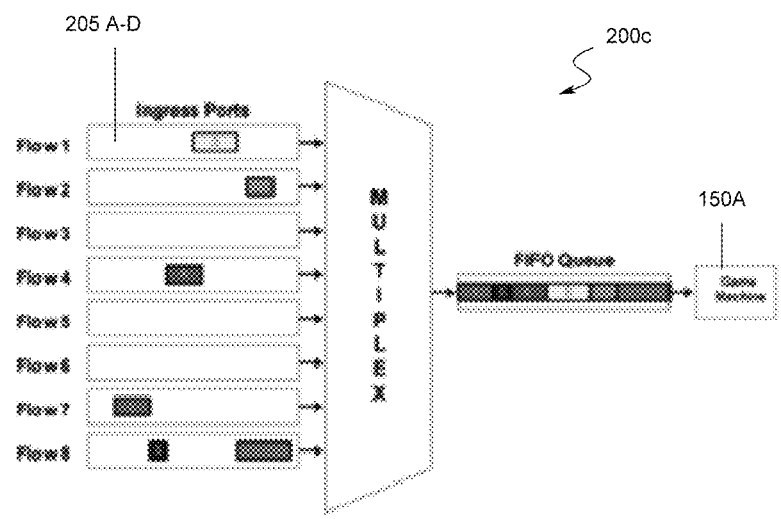
Figure 2D:
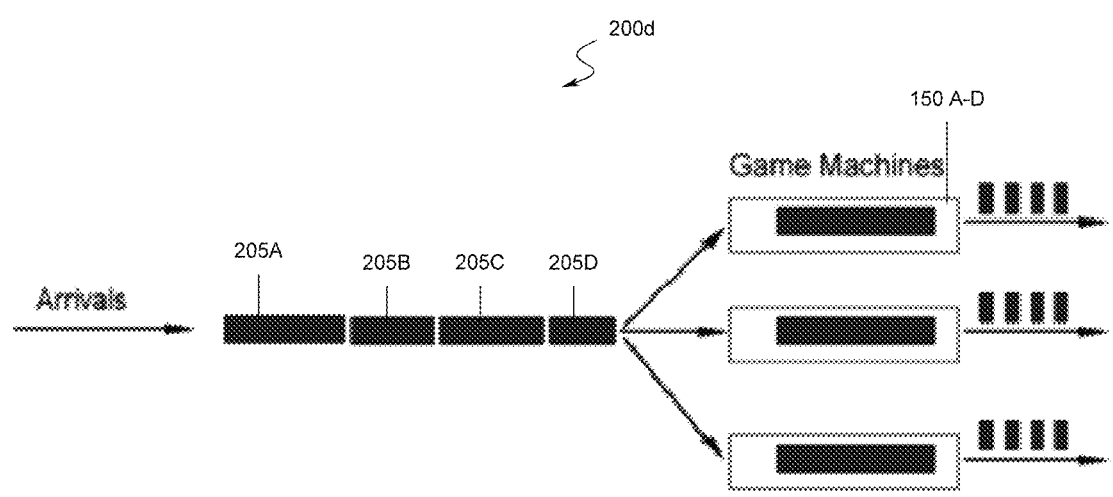

In an exemplary embodiment, there may exist one or more scenarios for queuing users for different games. For example, in a first in first out queueing scheme (FIFO) as illustrated in FIG. 2a for a single game machine serving players on a FIFO basis 200a, each user 205 A-D must wait for all players found in the system to complete playing before starting play a new game on arcade game 150A. A departure time for a user would equate to a sum of arrival time, a workload found in the system and the user play time. In another example, as illustrated in FIG. 2b, users 205 A-D are placed on an outbound link to egress 200b game machine 150A in FIFO order. A device multiplexes different flows arriving on various ingress ports onto an output buffer forming a FIFO queue. In yet another example as illustrated in FIG. 2c, multiple user's 205 A-D are queued simultaneously on multiple lines 200c. Users 205 A-D wait in a FIFO queue, and when an arcade game 150A-D becomes available the first user receives a priority to play the arcade game.

In a preferred embodiment a PUSH/POP/STATE protocol or active MQ protocol may be used for queueing or any other queuing protocol which falls within the scope of this disclosure may be employed. In another exemplary embodiment, user queuing module 251 includes a sequence accumulator for 251a for accumulating user requests with user ID identifiers for a First-in-First-out (FIFO) buffer, including a first identifier at the top of the FIFO buffer, a sequence announcer 251b for receiving and announcing the first identifier and for communicating with the sequence accumulator 251a, an advance commander 251c for advancing the FIFO buffer and for communicating with the sequence accumulator 251a, a user request receiver 251d for receiving a request with a second user with second user identifier, a request reader 251e for reading the second identifier and a comparator 251f for communicating with the sequence accumulator 251a and the request reader 251e and having an output communicating with the arcade game play system 100, where the comparator 251f receives the first and second user request identifiers, compares a time stamp of the first and second user request and directs the output to activate the arcade game play with a first user with a first identifier.

Arcade Game Node Architecture

Figure 3:
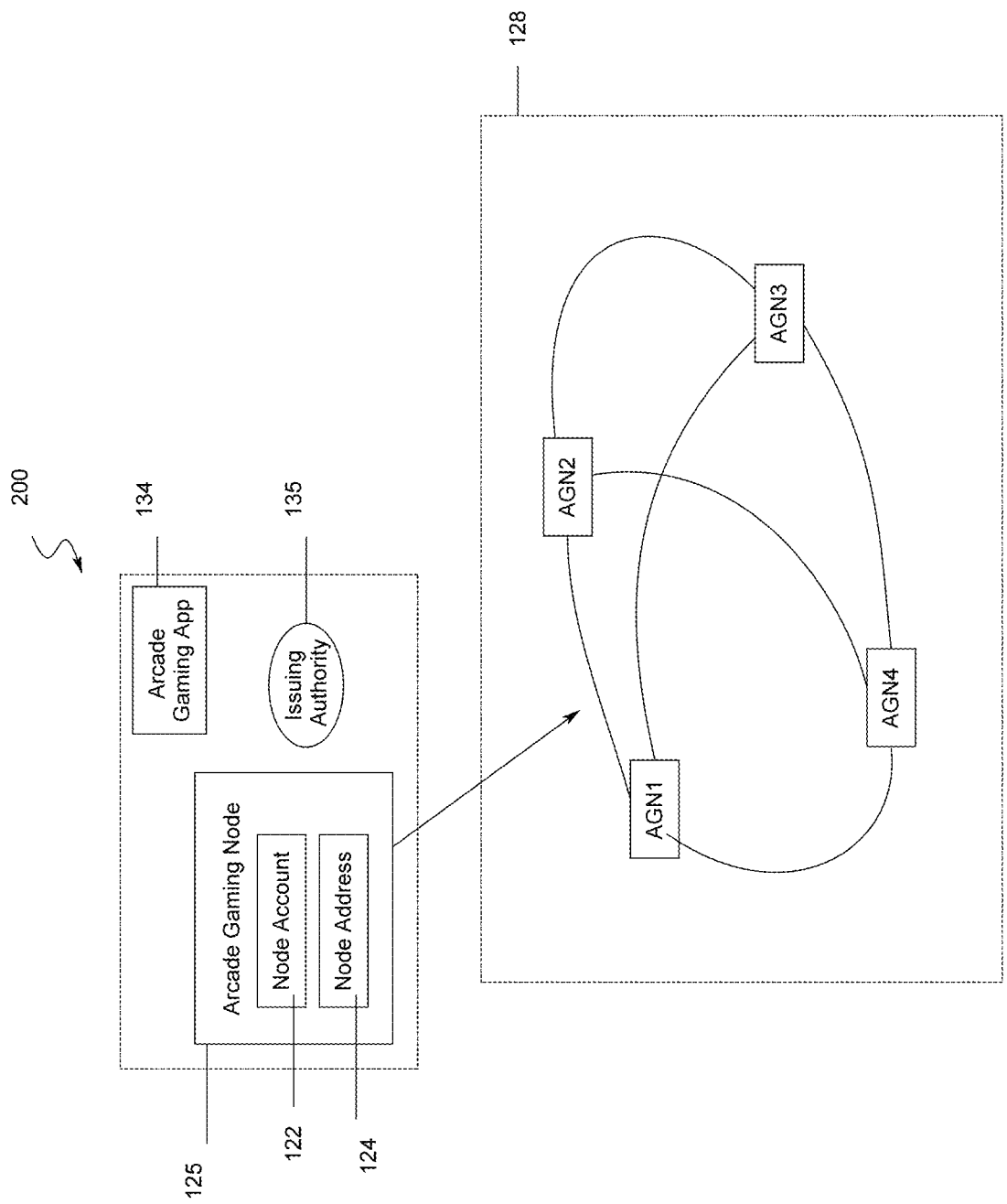
FIG. 3 is a system diagram of the nodes architecture.

Referring to FIG. 1, FIG. 2 and FIG. 3, the computing system 132 executes an arcade gaming application 134 that implements one or more arcade gaming (AG) nodes 125 controlled by an issuing authority 135. In the embodiment illustrated, the AG nodes 125 include four nodes AGN1-AGN4. However, the system 100 may include any number of AG nodes 125. Each of the AG nodes 125 may be implemented by a different computing device executing a copy of the arcade gaming application 134. However, this is not a requirement.

Each of the AG nodes 125 is associated with an AG node account 122 that stores units of a virtual currency as an account balance. Further, as will be described in detail below, the arcade gaming application 134 is configured to create units of the virtual currency via an initial transaction, store those units in its AG account 122, and issue units of the virtual currency to players 110 and/or watchers 115. As will also be described in detail below, the arcade gaming application 134 may also be configured to exchange (or redeem) units of the virtual currency for units of a real world (or fiat) currency or physical objects, including but not limited to toys, rewards and gifts. The account balance of a particular AG account 122 represents units of the virtual currency that have been redeemed (or sold back to the particular AG account) by the users, and/or units of the virtual currency that were created through an initial transaction by the issuing authority 135, but have not yet been issued to one or more of the users. Each of the AG nodes 125 may have a special-purpose AG node address 124 collected, authenticated and archived by the computing system 132.

The smart electronic devices 120 and 123 (see FIG. 1) operated by the users and watchers respectively, implement and represent one or more of AG nodes 125 that together define an arcade gaming network 128. Each of the AG nodes 125 operates autonomously and in a decentralized manner. Each of the AG nodes 125 may be implemented by the computing system 132 with cloud computing capabilities (see FIG. 1). Alternatively, each of the AG nodes 125 may be implemented by the computing system 132 without cloud computing capabilities. For ease of illustration, in FIG. 2, the arcade gaming network 128 is depicted as including four nodes AGN1-AGN4. However, the arcade gaming network 128 may include any number of nodes including but not limited to, the nodes represented by players, watchers, operators and owners of arcade games.

In an exemplary embodiment, the AG Nodes may represent players 110, watchers 115, owners 162, operators 163 or any user as follows. AGN1 may represent a master node or super node which is capable of controlling all transactions between the different AG nodes 125. The master node is also responsible for user sign-ups, redemptions of virtual currency for rewards, awarding score points and credits, queuing up players and more. AGN2 may represent an administrator node, which is managed and controlled by an entity who owns (Ex: owners 162) or operates (Ex: Operators 163) of the arcade games. This entity operates in order to benefit from virtual currency expended by players and watchers and also to help in scaling up of the arcade gaming network. AGN3 may represent player nodes, which are implemented by the smart electronic devices 120, which enable players 110 to play games on the arcade gaming system 100. AGN4 may represent watcher nodes, which is implemented by the smart electronic devices 125, which enable watchers to watch ongoing arcade gaming sessions on the arcade gaming system 100.

The system 100 provides a virtual currency infrastructure and platform that may be implemented as an open system enabling the use of the virtual currency by any user (e.g., player, watcher, and the like) that elects to accept or use the system 100. Purchases of the virtual currency from the AG nodes 125 may be conducted using conventional ecommerce clearance methods in which a third-party intermediary (For example credit card companies in conjugation with financial institutions) clears the fiat currency provided by the user. In such embodiments, purchases from the AG nodes 125 may not be anonymous. However, once units of the virtual currency have been issued, transactions between the users within the arcade gaming network 128 are conducted between cryptographic addresses (e.g., public keys) that have no necessary relationship to the users or to their identities. Therefore, all transactions between users may be anonymous.

As mentioned above, the system 100 may be a bidirectional system in which units of the virtual currency can be redeemed at the AG nodes 120 in exchange for fiat currencies or rewards. Redemption transactions whereby the units of the virtual currency are sold to the AG nodes 120 may be subject to conventional financial institutional protocols and therefore, may not be anonymous.

The system 100 enables direct transmission of units of the virtual currency between the users. Such direct transactions are cleared by a decentralized clearance system operating within the distributed arcade gaming network 128. Thus, the system 100 lacks a centralized clearance authority and does not use an intermediary to validate transactions between users. The issuing authority 135 has no role in approving or clearing transactions between users, and does not have the ability to trace individual transactions between users.

In an exemplary embodiment, within the arcade gaming network 128, the super node AGN1 may be implemented as a validation/storage node. Validation/storage nodes (e.g., the AGN1) is configured to validate transactions and store transaction receipts. Validation/storage nodes each include a validation/storage module that implements the functionality of the validation/storage node. The validation/storage module may be obtained (e.g., downloaded) from the computing system 132 operated by the issuing authority 135. Within the arcade gaming network 128, AGN2-4 function as client-only nodes and do not function as validation/storage nodes. A client node is configured to contact and route transactions to other nodes within the arcade gaming network 128. Transactions may be conducted by transferring units of the virtual currency (1) between different user accounts, (2) between different AG accounts, and (3) between a user account and an AG account. "Client" nodes include a client application 111 that implements the functionality of the "client" node. The client application 111 may be obtained (e.g., downloaded) from the computing system 132 operated by the issuing authority 135.

The user account is functionally a 'virtual repository' into which a user may receive or store units of the virtual currency, or from which a user may initiate a transaction. Each user account is associated with a public key 116 and a private key 118 that together form a key pair. The public key 116 may be used as the address of the user account 208. The private key 118 may be used to authorize a transaction message sending units of the virtual currency to a different user account. A user can generate and be associated with multiple user accounts and each user account may (and typically will) be associated with multiple transaction receipts. The balance of the user account is a total of all transaction receipts associated with the user account. As will be explained in detail below, whenever units of the virtual currency are added to or removed from an account, a transaction receipt is generated and copies of the receipt are stored in the nodes 125 of the network 128.

Users use the arcade gaming application 134 and queue in a line to play various arcade games 150A-D, spend time and money within the arcade game system 100 before exiting. They spend Z number of virtual currencies per unit time while using the arcade gaming application 134. The rate at which the system 100 earns is $*N*Z per unit time (N: average number of people in the application) the rate at which users pay is $$\lambda$ T per unit time ($\lambda$: Traffic arrival rate, T: Time per person). Over a certain period of time, the rate of park earning=Rate of people's payment or NZ=$\lambda$ T.

In an exemplary embodiment, a distributed ledger based on a block chain structure may be implemented for the arcade game system 100 in reference to the arcade game node structure described in FIG. 3. The block chain structure helps in reducing the overall transaction fee through disintermediation of middlemen. The immutability of transactions stored on block chains provides an audit trail for keeping track of user financial transactions, rewards disbursed and the like. The transparency of block chains provides for users to view and verify their transactions without losing their privacy (personal identification information). A general consensus by one or more nodes (AGN1-4) is a requirement for appending any changes in the nodal network.

In another exemplary embodiment, a two-tier token model for the arcade game node network described above is implemented. The network has two types of tokens—a primary token or a game token which will be publicly traded on exchanges and exchangeable for other cryptocurrency or fiat currencies. After a game play, winning players receive a secondary token or a game credit. The game credit cannot be publicly traded and cannot be exchanged for fiat currencies or other virtual currencies. They can only be redeemed for prizes in the form of goods and services.

Figure 3A:
FIG. 3a illustrates a standard function protocol for token creation.

In an example the primary token is developed as an Etherum token based on an Etherum Virtual machine (EVM), which assists in executing a framework for smart contracts. Etherum helps in storing transactions and provides a consensus mechanism between the different nodes of the arcade game system 100. The primary token will follow ERC223 standard which provides a capability for token creation through a common set of rules. ERC 223 standard describes eight common functions and one event as illustrated in a sequence chart 300*a* of FIG. 3*a*. In other examples third party wallets, including, but not limited to imToken, MyEtherWallet, Mist, Geth and Metamask may also be used in reference to the primary token for the arcade game system 100. For the secondary token open source software applications like hyperledger may be used for tabulating user game credits.

Figure 4:
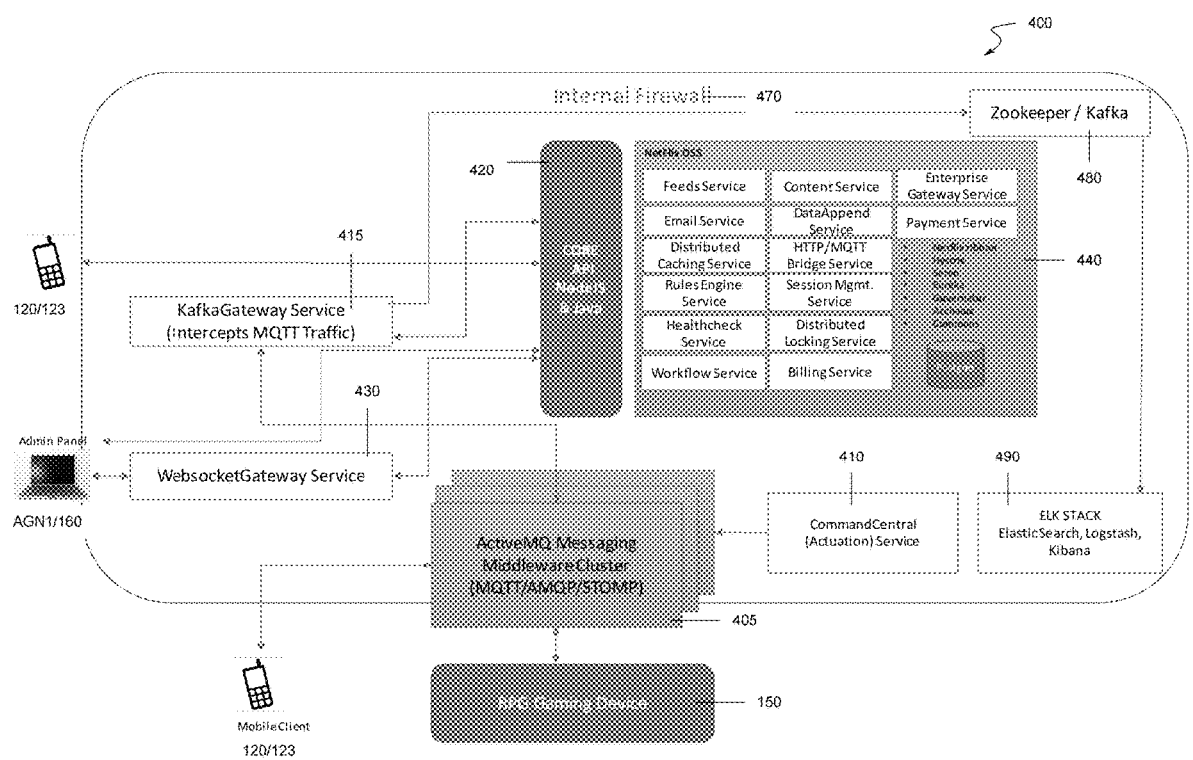
FIG. 4 illustrates cloud network architecture.

In an exemplary embodiment, a cloud network architecture 400 for the arcade game system 100, is as illustrated in FIG. 4. The user's electronic device 120/123 and the arcade game center are connected to Active MQ messaging Middleware Cluster 405 (MQTT/AMQP/STOMP) for synchronous data communication for the arcade game session. The cluster 405 is controlled by a Command Central Service 410 for implementing one or more actuation protocols.

The cluster 405 is seamlessly connected to a Node JS and JAVA Core Application Program Interface (API) 420 via a Kafka Gateway Service 415 (intercepts MQTT Traffic) for accessing the different APIs at the backend. The user electronic device 120/123 is directly connected to the Node JS and JAVA Core Application Program Interface (API) 420. An admin panel represented by a super node AGN1 or system administrators 160 is connected to the Node JS and JAVA Core Application Program Interface (API) 420 via Web socket Gateway Service 430.

The Node JS and JAVA Core Application Program Interface (API) 420 hosts a bunch of functional backend services based on a Netflix OSS 440. The different backend functional services include, but not limited to, Feeds service, Email service, Distributed caching service, Rules engine service, Health check service, Workflow service, Content service, Data append service, HTTP/MQTT bridge service, Session management service, Billing service, Enterprise gateway service, Payment service, Netflix ribbon, Hystrix, Servo, Eureka, Governator, Archaius, Commons and Postgres.

Further, the Kafka Gateway Service 415 is connected to a Zookeeper/Kafka API 480 via an internal firewall 470. The Zookeeper/Kafka API 480 is connected to a ELK STACK API 490 open source software application offering Elasticsearch, Logstash and Kibana. Elasticsearch is a search and analytics engine, Logstash is a server-side data processing pipeline that ingests data from multiple sources simultaneously to transform and send the data to a "stash" like Elasticsearch and Kibana helps visualize data with charts and graphs in Elasticsearch.

Exemplary Method for Arcade Game Play

Figure 5A:
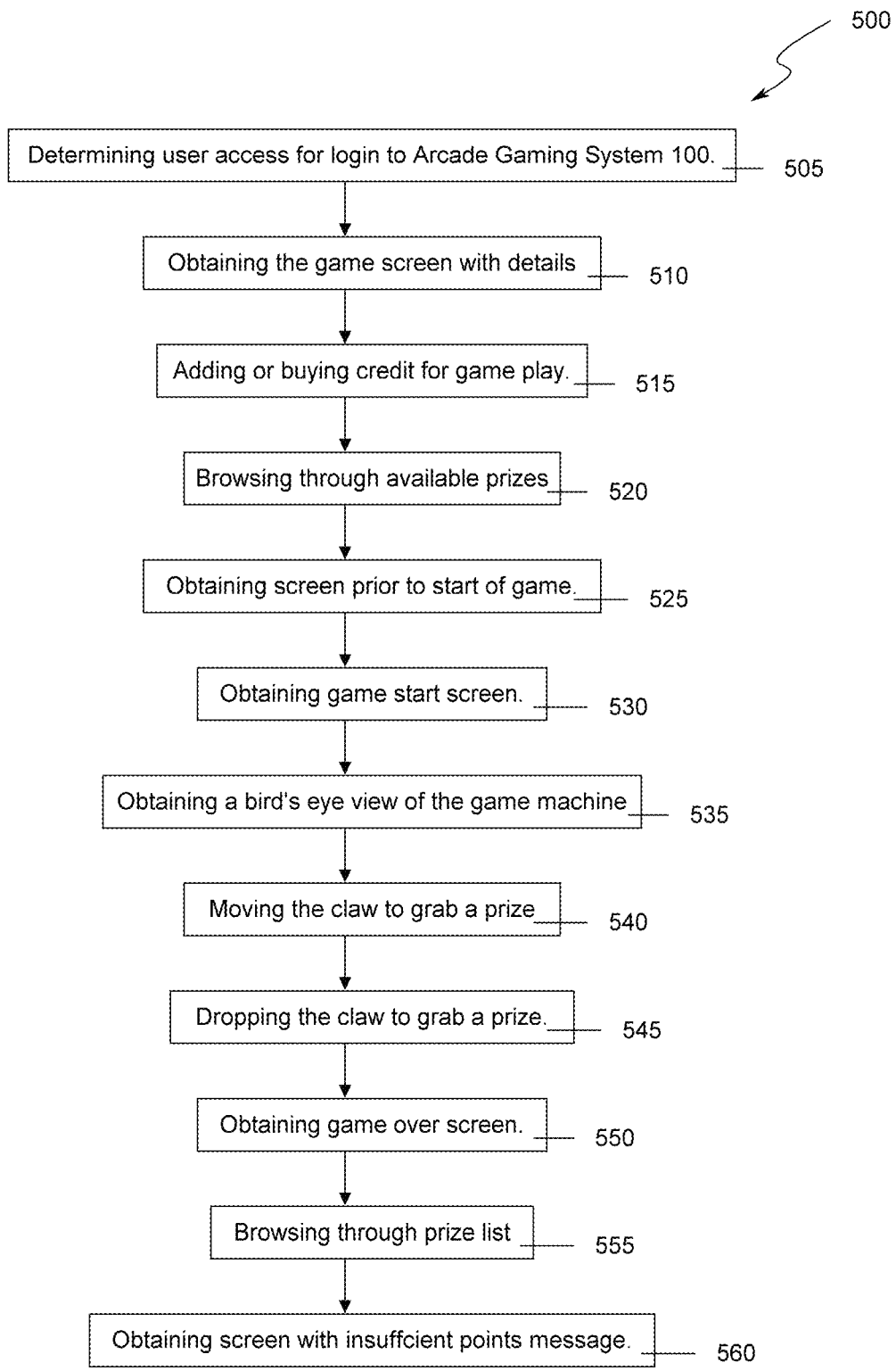
FIG. 5a illustrates exemplary method steps.

FIG. 5a shows a flowchart illustrating an exemplary method 500 for playing of arcade games remotely by a user in a system 100 in accordance with above described embodiments of the present disclosure.

As illustrated in FIG. 5a, the method 500 includes one or more blocks illustrating a method of playing arcade games using the arcade gaming system 100. The method 500 may be described in the general context of computer executable instructions. Generally, computer executable instructions can include routines, programs, objects, components, data structures, procedures, modules, and functions, which perform specific functions or implement specific abstract data types. The method 500 may utilize one or more smart electronic devices (mobile phones, electronic pads, tablets, desktop and laptop computer etc.) with user operable display interfaces for its implementation. The user may interact with the electronic devices of system 100 to implement the method 500 through any user interaction protocols, including but not limited to mouse click, touch screen or any other user interactions.

The order in which the method 500 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

Figure 5B:
FIG. 5b-5m illustrates exemplary screen shots related to the method steps.
Figure 5C:

At block 505, user registration to access the arcade game system 100 is determined. The arcade game system 100 initially displays one or more options on the display device 120/123. The one or more default options may be for example, login options with existing accounts like Facebook, Twitter or Google 506, login options with user name and password 507, and option for registering a new account 508 with the system 100 as illustrated in FIG. 5b. In real time, the user for example, the player 110 or the watcher 115 may select the existing account option 507 to gain access to the system 100. The arcade gaming app 134 authenticates the user, before initiating the game play. In one embodiment, the arcade gaming app 134 receives the user name and password for user and verifies the user using the login credentials. In an example, the arcade gaming app 134 offers to register 508 a new user if the user does not possess an account earlier. Based on successful determination of the user access to the system 100, arcade gaming app 134 verifies the user as an authorized user to play the arcade games and allows access to a game screen.

The user has an option to choose from one or more games provided by the arcade gaming system 100. The one or more games can be physically located at a single location or located at different locations and connected to the arcade gaming network. At block 510, an initial game screen 511 for the user chosen game is displayed on the display device 120/123 as illustrated in FIG. 5b. In this exemplary embodiment the user chosen game is a Claw game. The top portion of the screen displays the game arena 511, having a graphic representing the game and related advertisements to promote the game. A status bar 512 indicates the minimum number of points required to play the game and the number of points in the user account currently. The user is also given an option to add points to reach sufficiency to play the games. The lower portion of the screenshot displays a queue status 513 for the specific game chosen by the user. In an example the line may be open and the user may be the first in the que to play the game and in other examples a status for the position in the queue may be indicated.

Figure 5D:
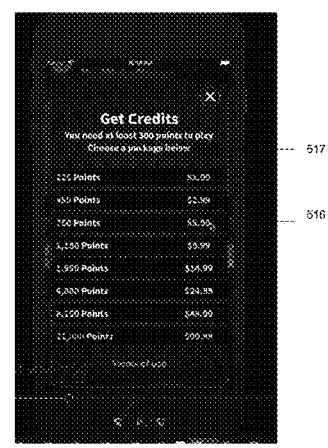

The arcade gaming system 100 provides options for the user to add points by buying credits to his/her existing account. At block 515, a screen shot 416 for adding or buying points is displayed as illustrated in FIG. 5d. The screen shot provides details of various packages with their respective pricing and also describes the terms and conditions for buying the packages. The screen shot also provides a message 517 for the minimum amount of points required to help the user select the correct package required for the user chosen game play.

Figure 5E:
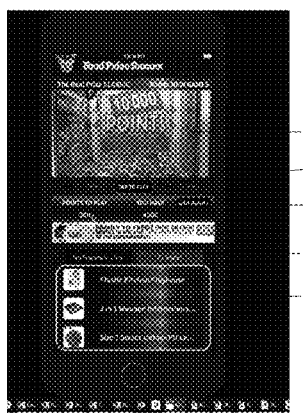
Figure 5F:
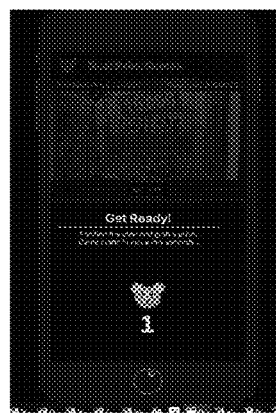

Upon successful addition of required points for playing the user chosen game, at block 520, a screen shot 521 is obtained as illustrated in FIG. 5e. The screen shot 521 displays the game arena 511 at the top portion, a status bar 512 indicating sufficient number of points to play the game. A lower portion of the screen displays a list of prizes 522 which can be won after winning in the game. The user is provided with an option to browse through the prizes to encourage the user to play a winning game in order to win the prizes. The user is now provided with a "Tap to play" option 523. When the user clicks the "Tap to play" option the user gains the access to play the user chosen game. At block 525 user is provided with a screenshot 526 prior to start of game. The screen shot 526 displays a "get ready" to play message 527 as illustrated in FIG. 5f. The screen shot 526 also displays a message to position the claw to grab a prize 527.

Figure 5G:
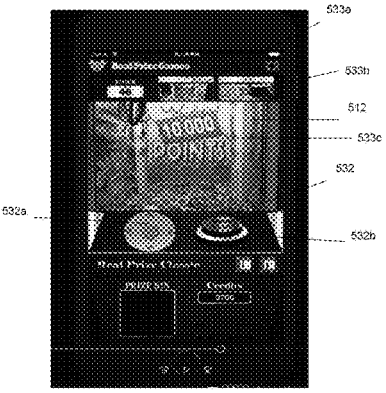

At block 530, the user is provided with a screen for starting an arcade game. The screen shot 531 for starting an arcade game is as illustrated in FIG. 5g. The screen shot 531 displays the game arena 512 at the upper portion. The control console 532 joystick control button on the left side 532a and a drop claw button 532b on the right side. The user may activate these buttons with the mouse click or touch screen or any other screen activation protocols, which fall in the scope of this disclosure. The joy stick button 532a assists in positioning the claw at a user desired position so as to grab a prize. The claw drop button 532b assists in dropping the claw into a bin to grab a prize in the bin. The user is also provided an option to switch between the with different modes of viewing the arcade game arena, for example top view 533a, birds eye view 533b, and front view 533c.

Figure 5H:
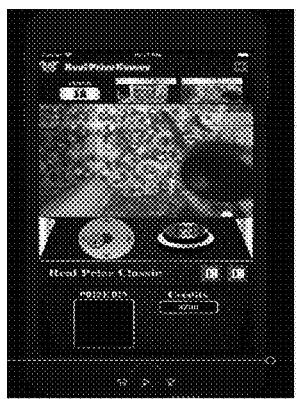
Figure 5I:
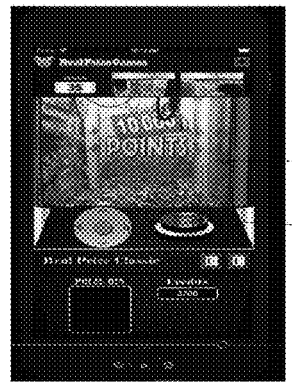
Figure 5J:

Upon choosing of bird's eye view by the user, at block 535, the user is provided with a bird's eye view of the arcade game. The screen shot for bird's eye view is as illustrated in FIG. 5h. The screenshot 536 provides a bird's eye view of the bin with prizes to give the user a better approximation for positioning the claw in the bin. At block 540 the user moves the claw horizontally to a spot to grab a prize. The screenshot 541 for moving the claw is as illustrated in FIG. 5i. When the user is all ready to drop the claw at block 545 the screen for dropping the claw into the bin of prizes is obtained. The screenshot 546 for dropping the claw is as illustrated in FIG. 5j. The user by the help of button 532b drops the claw into the game bin with one or more prizes and grabs a prize by the claw and further moves the claw to drop the grabbed prize into a prize bin 547.

Figure 5K:
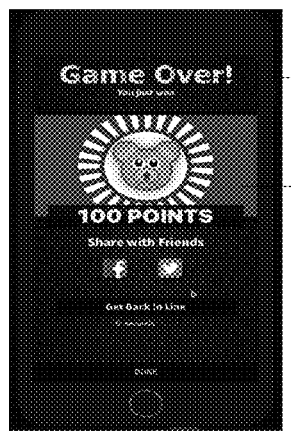

As the prize is dropped into the prize bin 547, at block 550 a game over screen is obtained. The screen shot 551 for game over screen is as illustrated in FIG. 5k. The screen shot 551 provides a winning message "Game Over" 552 and displays the number of points won in the game by the user and provides options for sharing the success story on social media like Facebook and Twitter. The screen shot 551 also displays a message to join back on line to play more games to put the user on the queueing line controlled by the arcade gaming queueing module.

Figure 5L:
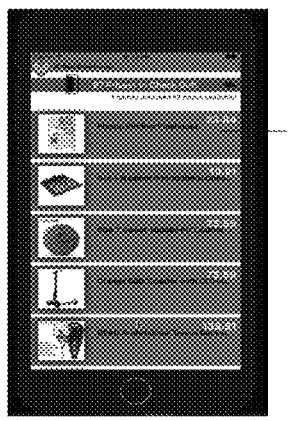
Figure 5M:
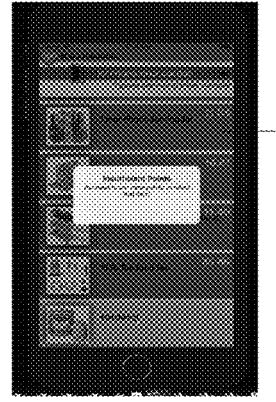

Upon choosing not return back on line, at block 555 a screen for browsing the prize list is obtained. The screenshot 456 for browsing the prize list is as illustrated in FIG. 5l. The user can check the prizes for the number of points he has won to see if the prize can be redeemed with the points. Upon clicking a prize which is not of equal value to the points possessed by the user a screen for insufficient points is obtained at block 560. The screen shot 561 for insufficient points is as illustrated in FIG. 5m.

In an exemplary embodiment, the arcade game system 100 can support a single player game as described above or may support multiplayer arcade games. The arcade game system 100 may also support staking by watchers 115, which enables the system to collect side bets on player's 110 probability for winning or losing an arcade game. The watchers 110 can gain a primary token or a secondary token and saved in their account for future use.

Those skilled in the art will recognize modifications and substitutions to the specific embodiments disclosed herein.

I claim:
1. A system for remotely playing an arcade game comprising:
    an arcade game session, said arcade game session comprising:
        a game video data stream, said game video data stream comprised of one or more cameras mounted in an arcade game, said one or more cameras providing image data for the game video data stream;
        a dropclaw control data stream, said dropclaw control data stream comprised of control data to control an arcade game dropclaw; and
        a joystick control data stream; said joystick control data stream comprised of control data to position the arcade game dropclaw over a bin of prizes;
    a player user electronic device, the player user electronic device having a video screen, a dropclaw button, a joystick button, and operably connected to a cloud server with cloud computing capability using a first media gateway, the player user electronic device having a means to electronically communicate with an arcade game machine using the arcade game session using the game video data stream, the dropclaw control data stream, and the joystick control data stream;
    a watcher user electronic device, the watcher user electronic device having a watcher video screen and the watcher user electronic device operably connected to the cloud server with cloud computing capability using a second media gateway, the watcher user electronic device having a means to electronically monitor the game video data stream of the arcade game session;
    an arcade game center with one or more arcade game machines located at a first remote site, the arcade game center operably connected to the cloud server with cloud computing capability using a third media gateway, the arcade game center having a means to electronically modify the arcade game session using the game video data stream, the dropclaw control data stream, and the joystick control data stream;
    an arcade center administrator user electronic device located at a second remote site; the arcade center administrator user electronic device operably connected to the cloud server with cloud computing capability using a fourth media gateway; the arcade center administrator user electronic device having a means to electronically modify the arcade game session using the game video data stream, the dropclaw control data stream, and the joystick control data stream; and
    wherein, when the arcade game session is initiated, the player user electronic device can remotely control the arcade game dropclaw via the arcade game session by an arcade game operator using the player user electronic device.

* * * * *